Oct. 16, 1956
L. L. HELTERLINE, JR
2,767,327
CONTROL CIRCUIT FOR X-RAY TUBES
Filed July 14, 1953
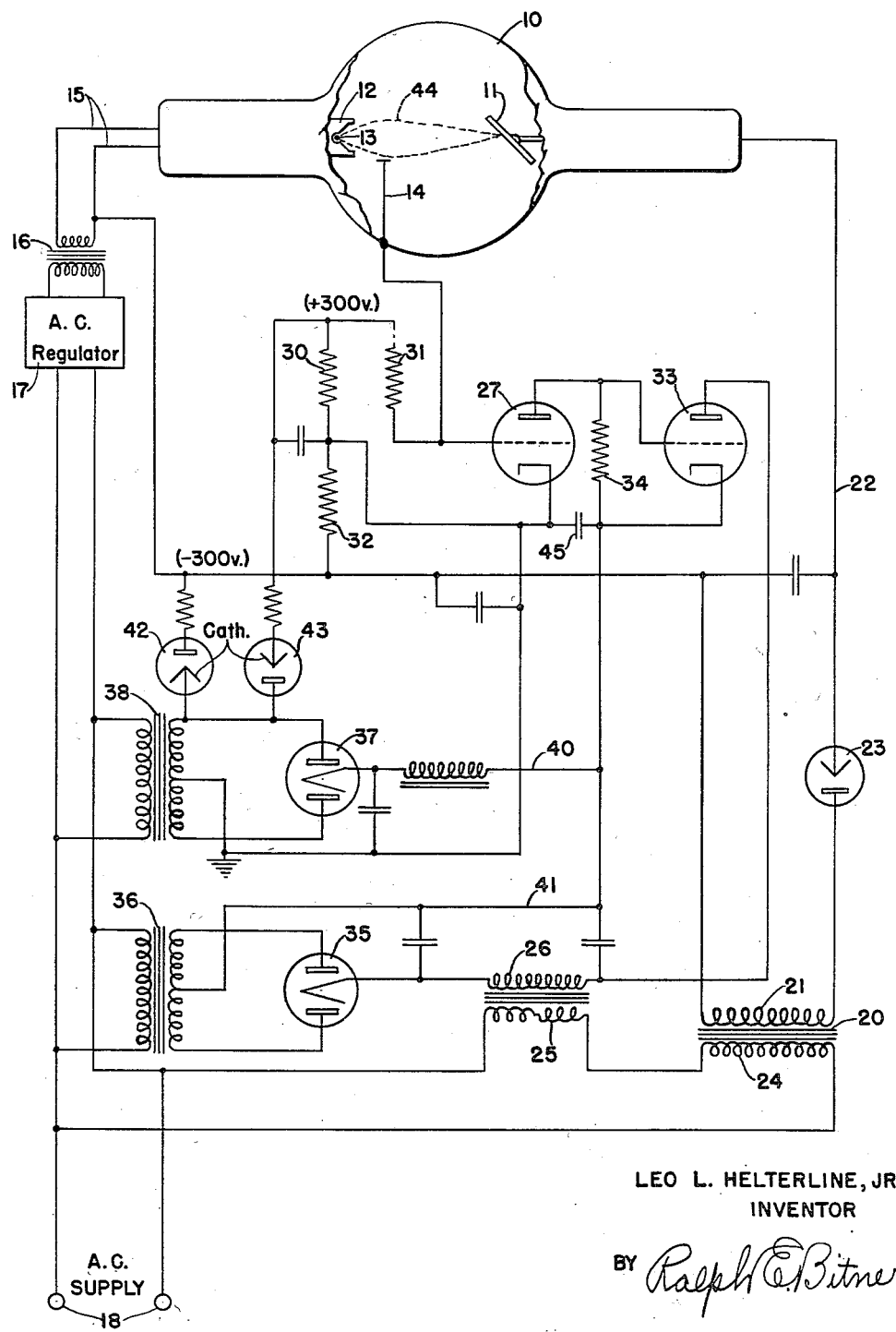
LEO L. HELTERLINE, JR.
INVENTOR
BY *Ralph E. Bitner*
ATTORNEY

United States Patent Office 2,767,327
Patented Oct. 16, 1956

2,767,327

CONTROL CIRCUIT FOR X-RAY TUBES

Leo L. Helterline, Jr., South Norwalk, Conn., assignor to Sorensen & Company, Inc., Stamford, Conn.

Application July 14, 1953, Serial No. 367,828

4 Claims. (Cl. 250—97)

This invention relates to a regulator for controlling the operation of an X-ray tube which may be used as a thickness gauge or other component in a measuring system. It has particular reference to the operation of an X-ray tube when the field pattern of the cathode ray beam is sensed by a probe. The invention also relates to the operation of control circuits which maintain the X-ray filament voltage at a constant predetermined value.

While the invention hereinafter described may be used for many applications it is particularly suited for use as a control circuit in a radiation thickness gauge which is employed to measure the thickness of sheet material such as iron, steel, or brass while it is being rolled. It is well known that such a thickness gauge has many advantages. It is not necessary to make physical contact with the moving strip in order to measure its thickness. The temperature of the strip or sheet to be measured is immaterial since the absorption of the X-rays depends entirely on the mass interposed between the source and a measuring instrument. In spite of these obvious advantages X-ray thickness gauges have not been universally employed because of their erratic behavior. It has been found by experiment that the change in output of an X-ray tube depends on many factors such as, change in filament voltage, change in anode voltage, and change in the field pattern of the electron beam. The result of these changes produces either a variable quantity of X-rays or X-rays having a variable penetrating power and in either event the measuring instrument gives an erroneous reading.

The present invention corrects the above mentioned errors by first supplying the filament of the X-ray tube with a constant voltage. Second the extent and intensity of the electron beam passing between the cathode and the anode of the X-ray tube is measured by a probe inserted in the tube envelope. The probe is supplied with a biasing voltage by an external source and the variation of voltage applied to the probe by the electron beam is employed to control a saturable reactor placed in the primary circuit of the transformer which supplies voltage and current for the anode. In this manner the X-ray output is controlled to give a constant quantity of radiation.

One of the objects of this invention is to provide an improved control circuit for X-ray tubes which avoids one or more of the disadvantages and limitations of prior art arrangements.

Another object of the invention is to control the output of an X-ray tube by using circuits of comparatively low voltage.

Another object of the invention is to control both the quantity and quality of the radiation from an X-ray tube so as to produce a constant reading on a radiation detection device when sheets of material having constant thickness are being measured.

Another object of the invention is to simplify the control of radiation thickness measuring units.

One feature of the invention includes a probe electrode inserted through the wall of an X-ray tube. An external connection is made to the probe and its voltage variations are employed to vary the saturation of a saturable reactor. The saturable reactor is connected in series with the input circuit to the anode supply transformer so that the voltage delivered to the anode is partly under control of the probe electrode.

For a better understanding of the present invention, together with other and further objects thereof, reference is made to the following description taken in connection with the accompanying drawing.

The drawing is a schematic diagram of connections showing the X-ray tube and its associated control circuit.

Referring now to the drawing an X-ray tube 10 comprises the usual envelope with an anode 11, a cathode 12 having a filament 13, and a probe electrode 14.

The filament 13 is supplied with electrical power through lead-in conductors 15, a transformer 16, and an alternating current regulator 17. This type of voltage regulator has been shown and described in a U. S. Patent, 2,455,143 issued to E. M. Sorensen, November 30, 1948. Regulator 17 is connected directly to terminals 18 which in turn are connected to a source of alternating current which may vary considerably in voltage value.

The anode 11 of X-ray tube 10 receives its voltage and current supply from a transformer 20, the secondary winding 21 of which is connected between one of the filament conductors 15 and the anode supply conductor 22 in series with a half-wave rectifier device 23. The primary winding 24 of transformer 20 is connected to one of the supply conductors 18 and a saturable reactor 25. The direct current control winding 26 of saturable reactor 25 controls the saturation of the core of reactor 25 and thereby adjusts the current and voltage delivered to transformer 20.

Probe 14 is connected externally to a control electrode in an amplifier tube 27, the probe-filament impedance being part of a Wheatstone bridge, which includes three other branches, resistors 30, 31, and 32. The anode of tube 27 is connected directly to the control electrode of a second amplifier tube 33 and the cathode of this tube is connected to the lower terminal of a coupling resistor 34, the upper end of which is connected to the anode of tube 27. The anode of tube 23 is connected to the direct current control winding of saturable reactor 25. The other end of winding 26 is connected to a filament of a double rectifier tube 35 which receives its power from a transformer 36. The mid-point of the secondary winding of transformer 36 is connected to the cathode of tube 33 and to a filament of a second double rectifier tube 37 which is supplied by a transformer 38. It should be noted that these two rectifier circuits are connected in series arrangement, the positive conductor 40 of rectifier 37 being connected to the negative conductor 41 of the rectifier circuit 35.

The above described rectifier circuits supply the anode currents for tubes 27 and 33, directly coupled to each other to form a direct current amplifier. Bridge circuit 30, 31, 32 is supplied with direct current from two rectifier units 42 and 43. Each of these rectifier units is connected to one of the treminals of the secondary winding of transformer 38 and one of the units 42 supplies a negative voltage which may be of the order of 300 volts to the filament of the X-ray tube. The second rectifier 43 supplies a positive voltage to the top junction of the bridge circuit where resistors 30 and 31 are joined. This voltage may be of the order of 300 volts positive. The net result is an overall voltage across Wheatstone bridge terminals which may be of the order of 600 volts. If bridge is balanced and the resistors 30, 31 and 32 are of equal value the control electrode of tube 27 will be at ground potential which is 300 volts above the voltage of the filament 13.

When the X-ray tube is in operation the electrons given off by filament 13 will be drawn to the anode 11 because of the high electrostatic field existing between them. The shape of the electron beam is somewhat similar to the beam 44 shown in dotted lines. The boundry of this beam is not an abrupt change from a region of many electrons to no electrons at all since there are always stray electrons somewhere within the tube envelope. The number and intensity of the stray electrons is a function of the anode voltage, the higher the voltage, the fewer stray electrons exist outside the beam.

Probe 14 is externally connected to a voltage supply which is 300 volts more positive than the potential of the filament but this connection is through resistor 31 which has a very high value (about one megohm) and therefore the potential of probe 14 may be changed considerably by the number of stray electrons which strike it within the tube. If the voltage applied to the anode 11 is higher than an average value beam 44 is made more narrow and fewer electrons strike probe 14. Conversely if the voltage of anode 11 is reduced beam 44 is made considerably wider and more stray electrons will be collected by the probe.

The operation of the control circuit is as follows: Let it first be assumed that the alternating current supply line is reduced in voltage, thereby reducing the voltage on anode 11. This widens the beam 44 and increases the number of stray electrons within the tube, causing more of them to be collected by probe 14 and reducing the voltage of the control electrode in amplifier tube 27. This action reduces the anode current in the tube and increases the potential of the control electrode of amplifier tube 33 increasing its anode current and increasing the current through control winding 26. The increase in current increases the saturation of saturable reactor 25, lowering its inductance and thereby increasing the voltage applied to primary winding 24 of conductor 20 and compensating for the decrease in applied voltage on supply terminals 18. An increase in the applied voltage will cause a reverse action resulting in less saturation of saturable reactor 25 and a decrease in the voltage applied across winding 24 to just compensate for the variation.

It should be remembered that the voltage supplied to anode 11 is a unidirectional pulsating voltage because of the half-wave rectifier 23. For this reason the shape of the electron beam 44 is variable throughout each cycle and the number of stray electrons also varies in a cyclic manner causing an alternating voltage wave to be impressed on the control electrode of tube 27. To eliminate this wave a large capacitor 45 is connected between the cathodes of tubes 27 and 33. Other capacitors and inductors are employed in well known circuit connections to eliminate alternating components and to stabilize the control circuit.

While there have been described and illustrated specific embodiments of the invention, it will be obvious that various changes and modifications may be made therein without departing from the field of the invention which should be limited only by the appended claims.

I claim:

1. A control circuit for an X-ray tube comprising; an X-ray tube containing a filamentary cathode, an anode, and a probe electrode; said probe electrode mounted adjacent to the path taken by an electron beam between the anode and cathode; a source of regulated alternating current power connected to the filamentary cathode; a connection between the probe electrode and a four-armed bridge circuit which includes three impedances and the cathode-probe impedance as the four arms thereof; means for deriving a direct current from an alternating current source for supplying the anode in the X-ray tube; a saturable reactor coupled to said alternating current source and having a direct current control winding; and a direct current amplifier having its input circuit connected to said probe and its output circuit connected to the control winding of the saturable reactor.

2. A control circuit for an X-ray tube comprising an X-ray tube containing a filamentary cathode, an anode, and a probe electrode; said probe electrode mounted adjacent to the path taken by an electron beam between the anode and cathode; a source of regulated alternating current power connected to the filamentary cathode; a connection between the probe electrode and a four-armed bridge circuit which includes three impedances and the cathode-probe impedance as the four arms thereof; a direct current voltage supply for the bridge which also supplies a potential to the probe electrode; means for deriving a direct current from an alternating current source for supplying the anode in the X-ray tube; a saturable reactor coupled to said alternating current source and having a direct current control winding for varying its reactance; and a direct current amplifier having its input circuit connected to said probe and its output circuit connected to the control winding of the saturable reactor.

3. A control circuit for an X-ray tube comprising; an X-ray tube containing a cathode, an anode, and a probe electrode; said probe electrode mounted adjacent to the path taken by an electron beam between the anode and the cathode; a connection between the probe electrode and a four-armed bridge circuit which includes three impedances and the cathode-probe impedance as the four arms thereof; means for deriving a direct current from an alternating current source for supplying the anode in the X-ray tube; a saturable reactor coupled to said alternating current source and having a direct current control winding; and a direct current amplifier including an input circuit connected to the cathode-probe and an output circuit connected to the control winding.

4. A control circuit for an X-ray tube comprising; an X-ray tube containing a cathode, an anode, and a probe electrode; said probe electrode mounted adjacent to the path taken by an electron beam between the anode and the cathode; a connection between the probe electrode and a four-armed bridge circuit which includes three impedances and the cathode-probe impedance as the four arms thereof; a direct current voltage supply connected to the bridge and also supplying a potential to the probe electrode; means for deriving a direct current from an alternating current source for supplying the anode in the X-ray tube with high voltage power; a saturable reactor coupled to said alternating current source and having a direct current control winding; and a direct current amplifier including an input circuit connected to the cathode-probe and an output circuit connected to the control winding.

References Cited in the file of this patent
UNITED STATES PATENTS

| | | |
|---|---|---|
| 2,503,075 | Smith | Apr. 4, 1950 |
| 2,562,637 | Park et al. | July 31, 1951 |
| 2,617,045 | Coe | Nov. 4, 1952 |